United States Patent [19]

Furo et al.

[11] Patent Number: 4,746,807
[45] Date of Patent: May 24, 1988

[54] AUTOMATIC CONTROL SYSTEM FOR CONTROLLING THE OUTPUT POWER OF A POWER PLANT

[75] Inventors: Isao Furo; Suketsugu Kabayama, both of Hyogo, Japan

[73] Assignee: Mitsubishi Denki Kabushiki Kaisha, Tokyo, Japan

[21] Appl. No.: 7,470

[22] Filed: Jan. 28, 1987

[30] Foreign Application Priority Data

Jan. 29, 1986 [JP] Japan .................................. 61-18747

[51] Int. Cl.⁴ ............................................ F01D 17/04
[52] U.S. Cl. ..................................... 290/40 C; 290/51
[58] Field of Search ................. 60/660; 290/52, 40 B, 290/40 C, 40 R, 51

[56] References Cited

U.S. PATENT DOCUMENTS

| | | | |
|---|---|---|---|
| 3,986,788 | 10/1976 | Rossi | 290/40 A X |
| 4,005,581 | 2/1977 | Aanstad | 60/660 |
| 4,039,846 | 8/1977 | Vance | 290/40 R X |
| 4,120,159 | 10/1978 | Matsumoto et al. | 290/40 C X |
| 4,653,276 | 3/1987 | Sugano et al. | 290/40 C X |

FOREIGN PATENT DOCUMENTS

2707974  8/1978  Fed. Rep. of Germany .
57-36600  6/1982  Japan .

OTHER PUBLICATIONS

Kansai Electric Power Co., Inc., "Standard Specifications For Automatic Load Regulators", Dec. 5, 1984, pp. 47-48.

*Primary Examiner*—William M. Shoop, Jr.
*Assistant Examiner*—W. E. Duncanson, Jr.
*Attorney, Agent, or Firm*—Bernard, Rothwell & Brown

[57] ABSTRACT

An automatic control system for a power plant including a torque such as a steam turbine and a generator for converting the generated torque into electrical output. The control system comprises a torque controller such as a steam control valve for adjusting the amount of torque generation for controlling the amount of power generation, an output signal target setter which sets the target of torque output necessary for a certain electrical output and provides an output signal, a comparator which compares an actual output to a power system connected to the power plant with the target, a command output setter which cuts the command output provided by the comparator to the torque controller at an upper setup level and lower setup level of the system frequency and validates the command output only when the system frequency is within the range, and a power generation controller which receives a torque down command produced by the comparator when the actual output is larger than the setup target and a torque up command produced when the actual output is smaller than the preset target only when the system frequency is within the range as set by the command output setter and provides a control signal to the torque controller.

5 Claims, 4 Drawing Sheets

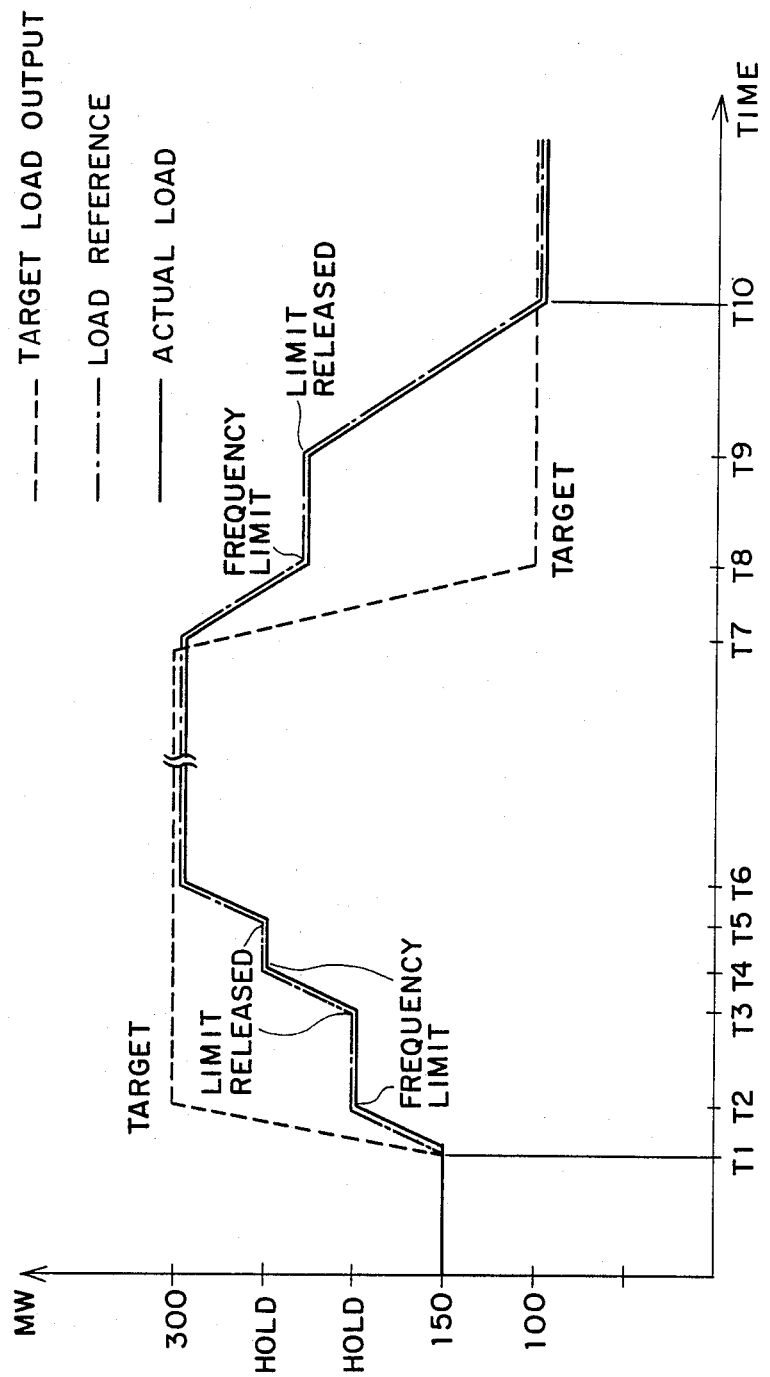

AUTOMATIC CONTROL SYSTEM FOR CONTROLLING THE OUTPUT POWER OF A POWER PLANT

BACKGROUND OF THE INVENTION

1. Field of the Invention

The present invention relates to an automatic control system for controlling the output power of a power plant which operates with hydraulic turbines or steam turbines, and more particularly to an automatic control system categorized as an electrical governor or automatic load regulator (ALR) which automatically controls the output power from a turbine generator.

2. Description of the Prior Art

Generally, power plants of various types operate to control the output power in several manners. In the case of a steam turbine power plant, output power control is implemented either by the manual control system in which the operator manipulates a governor motor, for example, while watching the output power meter or by the automatic control system in which an electrohydraulic governor, for example, operates to control the output power toward a preset target output power level. Application of the latter system has the premise that the power plant is connected to a power system which is incomparably larger in capacity than the plant.

It has been the convention of a power generating plant, which is instructed by the central load dispatching office to increase or decrease the output, to control the facility in either manual or automatic manner by aiming at the intended final output level. However, in case a power plant has a capacity which is comparable with that of a connected power system, an increase of power generation in anticipation of increasing system load will result in a rising power system frequency unless the system load actually increases as expected. Conversely, a decrease of power generation by simply following a requested target output level will result in a fall in the power system frequency unless the system load decreases as anticipated. These are inherent characteristics of electricity in which generation and consumption take place simultaneously.

An example of automatic load regulators is disclosed in "Standard Specifications for Automatic Load Regulators", pp. 47-48, published on Dec. 5, 1984, by Kansai Electric Power Co., Inc.

It has not been possible, without the presence of the above-mentioned premise, for conventional electrohydraulic governors and automatic load regulators to control the output power in compliance with the command from the central load dispatching office and varying load conditions while minimizing the variation in the power system frequency, and on the other hand the manual control system has required an enormous operator proficiency and manpower.

Although it is possible to automatically control the power generation together with an automatic frequency control (AFC) system with the intention of balancing the output power and system frequency, such AFC systems are not only complicated, but also quite expensive, therefore these apparatus impose a rise in the initial construction cost.

SUMMARY OF THE INVENTION

It is an object of this invention to provide an automatic control system for automatically and continuously controlling the output of a power plant, which is feeding the electric power to a power system having a capacity comparable with or smaller than the capacity of the power plant, in response to an increase or decrease of the system load within a certain range of the power system frequency.

Another object of this invention is to provide an automatic control system for controlling the output power of a power plant, which is simple and inexpensive as opposed to the conventional complicated and costly AFC system.

In order to achieve the above objectives, the inventive automatic control system for controlling the output power of a power plant introduces an upper limit and lower limit of the power system frequency to a target setting control (programmed control) function so that the power output control takes place only within the limited range of the system frequency, and eventually the output power automatically follows up to the target output level in response to an increase or decrease of the system load.

BRIEF DESCRIPTION OF THE DRAWINGS

FIG. 4 is a characteristic diagram used to explain the operation of the embodiment shown in FIG. 3.

DETAILED DESCRIPTION OF THE PREFERRED EMBODIMENTS

Preferred embodiments of the automatic control system for controlling the output power of a power plant according to this invention will be described in detail by making reference to the drawings.

Figure 1:
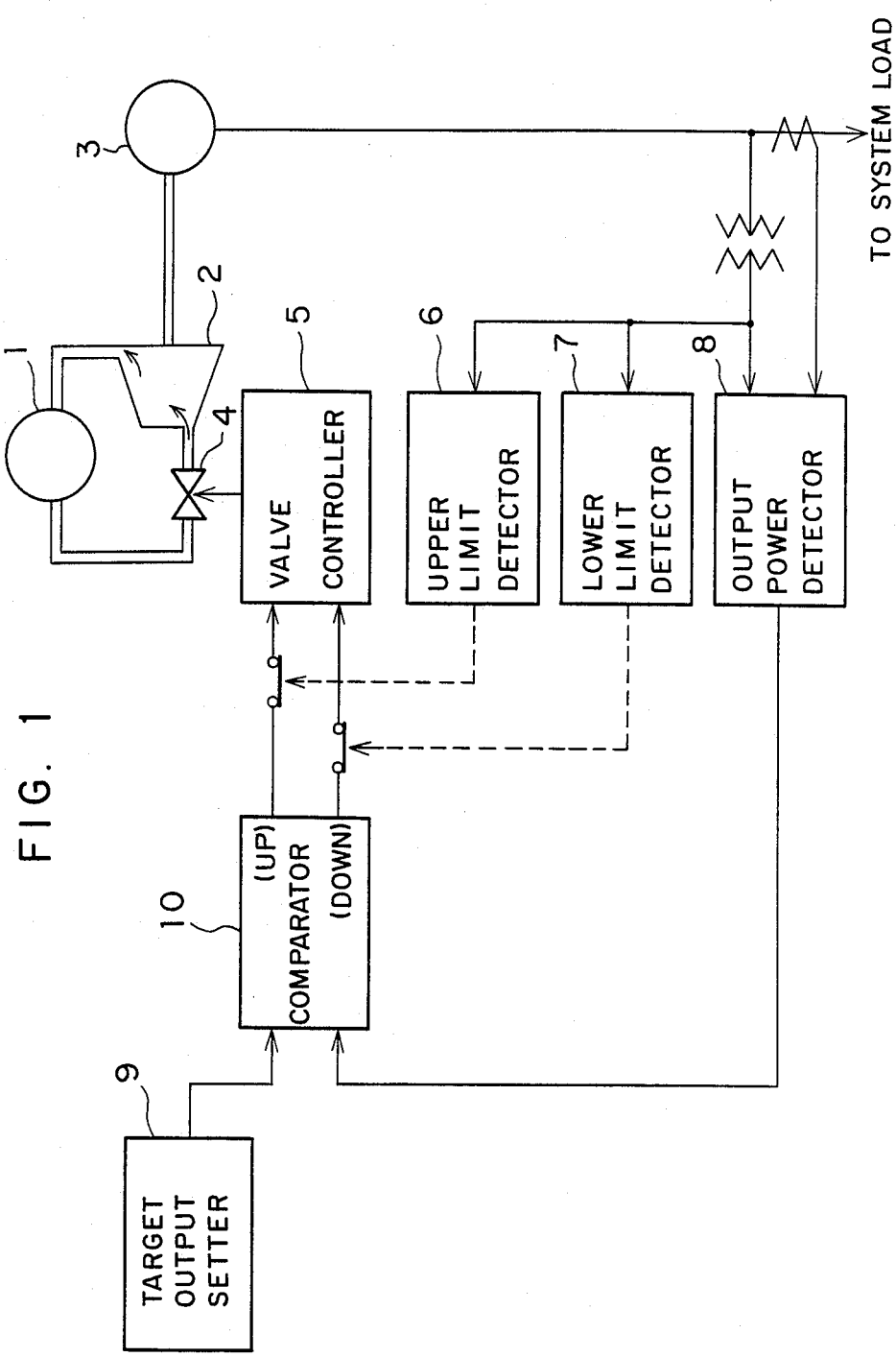
FIG. 1 is a block diagram showing an embodiment of the automatic control system for controlling the output power of a power plant according to the present invention.

In FIG. 1 showing in block diagram an embodiment of this invention, reference number 1 denotes a steam generator, 2 is a steam turbine as a torque generation means for producing mechanical power, 3 is a generator for producing electric power from mechanical power provided by the turbine 2, 4 is a steam control valve as a torque generation means for adjusting the amount of steam to be supplied to the turbine 2, 5 is a valve controller for controlling the steam control valve 4, taking the role of an ALR or governor, 6 is a detector for detecting the allowable upper limit of the system frequency, 7 is a detector for detecting the allowable lower limit of the system frequency, 8 is a detector for detecting the output power of the generator 3, 9 is an output target setter for setting a subsequent output target for the generator 3, and 10 is a comparator which compares the actual output power with the target level set on the output target setter 9 to determine the increase or decrease of the generator output.

When the power plant receives from the central load dispatching office the instruction of increasing or decreasing the output, the output command is set on the target output setter 9. The comparator 10 compares the actual output of the output power detector 8 with the output command, and issues an increase signal to the valve controller 5 if the command is higher than the output level or issues a decrease signal if the command is lower than the output level.

The valve controller 5 operates the steam control valve 4 at a rate of change allowed by the steam generator 1, turbine 2 and generator 3 in response to the up or down output of the comparator so as to change the output of the generator 3. When the actual output of the generator 3 has become equal to the setting on the target output setter 9, the comparator 10 provides no output signal, and the output power is controlled to the output command level.

In this case, during a rise in the generator output in response to an increased setting of the target output setter 9, if the system load connected to the generator 3 does not increase at the same time, an excessive energy produced by the generator causes the system frequency to rise. If the system frequency exceeds the upper limit as detected by the frequency upper limit detector 6, the up-signal from the comparator 10 is cut off and the power output increasing operation is suspended temporarily. Thereafter, when the system load increases, making a move of the system frequency downward, and then below the setting on the frequency upper limit detector 6, the up-signal of the comparator 10 is conducted again to the valve controller 5 and the generator 3 increases its output. The power decreasing operation takes place in the same manner by the operation of the frequency lower limit detector 7.

Figure 2:
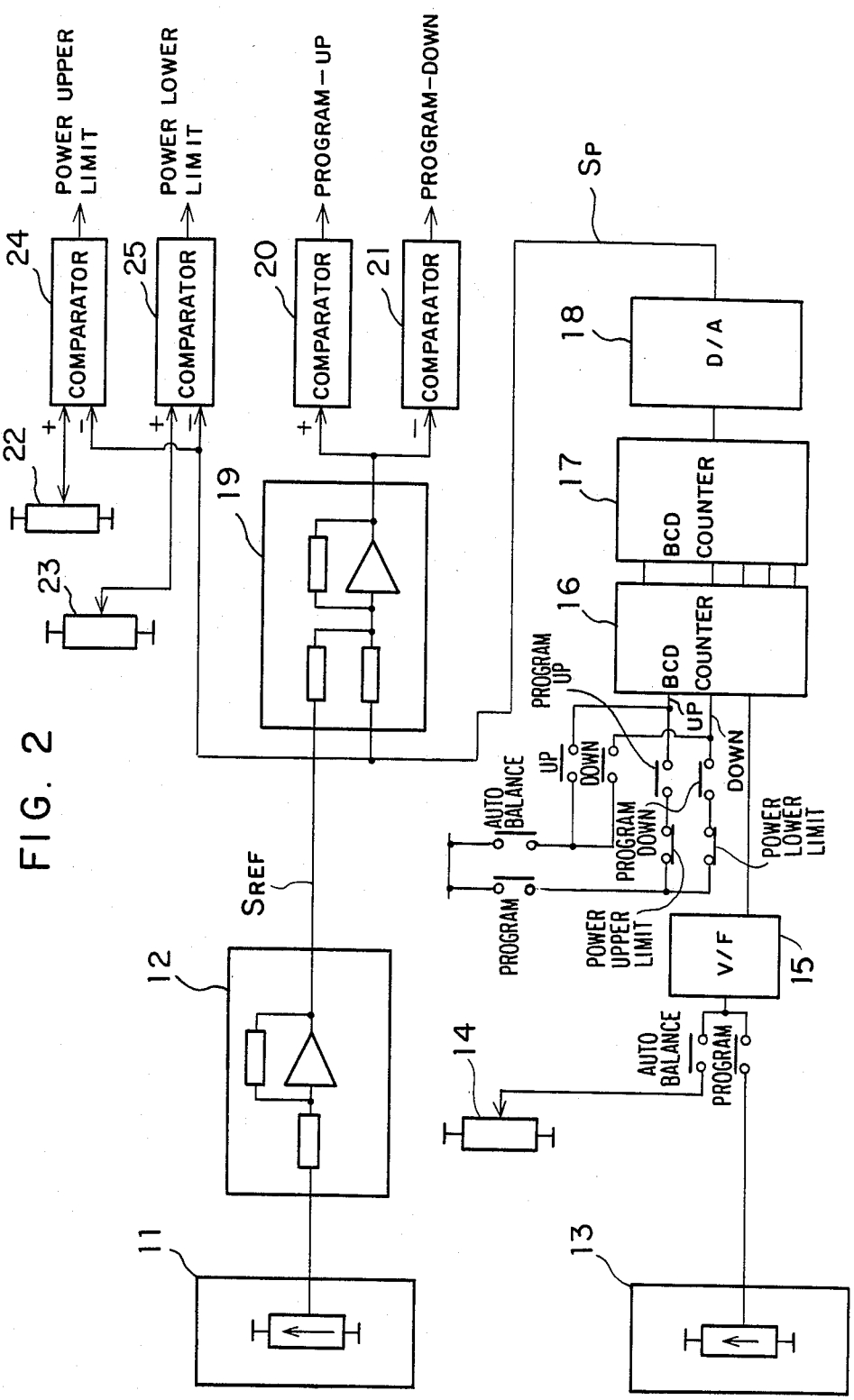
FIG. 2 is a block diagram used to explain the program generator of the embodiment shown in FIG. 1.

In this embodiment, the system frequency is detected to interrupt the up or down signal, and the actual control system operates as a programmed control using a program signal generating circuit as shown in FIG. 2. The arrangement of FIG. 2 includes an output setter 11 for setting a target load level, an amplifier 12 for reversing the polarity of the output of the output setter 11, an output variation rate setter 13 for making the output variation rate to match the response of the boiler or turbine, for example, an auto-balancing setter 14, a V/F converter 15 for converting the voltage to the frequency, program signal generators 16 and 17, including digital BCD counters, for determining the variation rate of the load, a digital-to-analog (D/A) converter 18, a comparing amplifier 19 for comparing the output of the D/A converter 18 with the target load level $S_{REF}$ provided by the amplifier 12 and provides an amplified comparison result, comparators 20 and 21 for detecting a program-up or program-down based on the output of the amplifier 19, setters 22 and 23 for setting the upper limit and lower limit of the system output power, and comparators 24 and 25 for comparing the program signal $S_p$ with the outputs of the power upper and lower limit setters 22 and 23 to detect the limits.

Next, the major operation of the above arrangement will be described with reference to FIG. 2. The program-up/down signals are converted into pulse frequencies by application of the output of the output variation rate setter 13 to the V/F converter 15. The output of the program signal generator 16 is counted down by the binary counter, the output of which is counted by the 3-digit BCD counter in the program signal generator 17. The output of the program signal generator 17 is converted into an analog signal by the D/A converter 18, and the resultant program signal $S_p$ is fed to the amplifier 19 and comparator 24 and 25.

Control for the upper and lower limits of the generator output is as follows. When the program signal $S_p$ rises beyond a certain level, the upper limit setter 22 and lower limit setter 23 operate to issue a command signal to the comparators 24 and 25. The setter 14 is to operate on the ALR to turn on automatically to implement automatic load adjustment, called autobalancing.

According to this embodiment, the output increase signal from the program control circuit is cut off at the system frequency upper limit and the output decrease signal is cut off at the lower limit, so that these signals act effectively to maintain the system frequency within the limited range.

Although in the above embodiment, the amount of steam fed to the turbine 2 is controlled, the same effectiveness is achieved when the amount of fuel supplied to the steam generator 1 is controlled.

Figure 3:
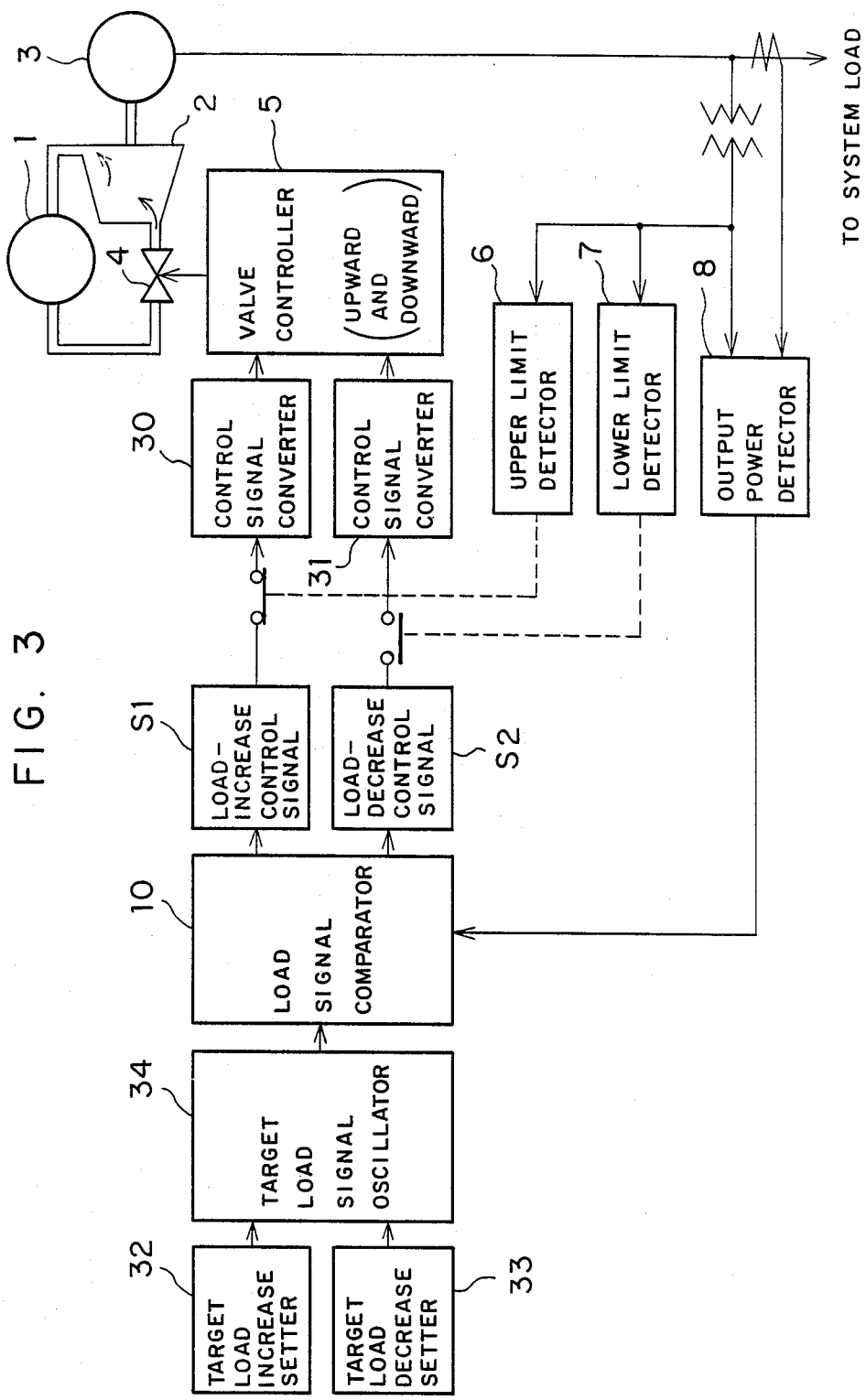
FIG. 3 is a block diagram showing another embodiment of this invention.

Although in the above embodiment the arrangement and operation of the valve controller 5 and target output setter 9 are simplified for explanation, the arrangement and operation may be these as shown in FIGS. 3 and 4. In the modified embodiment shown in FIG. 3, the upper and lower limit signals to the valve controller 5 are converted by control signal converters 30 and 31. Alternatively, arrangement may be made such that the target output fed to the comparator 10 is set on a target load increase setter 32 and target load decrease setter 33, the target load signal is produced by a target load signal generator 34 based on the values of the setters, and it is fed to a comparator 10 which provides a load-increase control signal S1 and load-decrease control signal S2 to the converters 30 and 31. Through the control taking account of the load variation, the control characteristics as shown in FIG. 4 are achieved.

According to the inventive automatic control system for power generation in a power plant, as described above in detail, a load increase and load decrease of a power system connected to the power plant are detected from the variation in the system frequency within the range between a certain upper and lower limits and power generation is controlled automatically based on the change in the system frequency within the limited range, whereby the output power can be controlled effectively based on the frequency variation within the range even if the power system has a capacity which is not incomparably larger than the capacity of the power plant.

Moreover, the inventive automatic control system is simpler in configuration and less expensive in manufacturing than conventional AFC apparatus and the like.

What is claimed is:

1. An automatic control system for a power plant incorporating a torque generation means which produces a constant torque and a generator which converts the torque produced by said torque generation means into an electrical output, said control system comprising:
   a torque control means which controls the amount of torque produced by said torque generation means;
   an output signal target setting means which sets, as an output signal, a target value of torque output necessary for a certain electrical output;
   a comparison means which compares a detected output of a power system connected to said power plant with said target value;
   a command output setting means which cuts a command output provided by said comparison means to said power plant at an upper limit and lower limit of frequency of output to said power system, and validates the command output only when the system frequency is within a certain range; and
   a power generation control means which receives a torque generation down command produced by said comparison means when the detected value is larger than the target value and a torque generation up command produced when the detected value is smaller than the target value only when the system output frequency is within the range as set by said command output setting means, and provides a control signal to said torque control means.

2. An automatic control system according to claim 1, wherein said torque generation means comprises a steam turbine and said torque control means comprises a steam control valve which controls the amount of torque generation by said steam turbine by adjusting the amount of steam fed to said steam turbine.

3. An automatic control system according to claim 1, wherein said command output setting means comprises a frequency upper limit setting means which detects the power system frequency and cuts off the command output when the detected system frequency has exceeded a preset upper limit, and a frequency lower limit setting means which cuts off the command output when the detected system frequency has fallen below a preset lower limit.

4. An automatic control system according to claim 3, wherein said frequency upper limit setting means comprises a switch provided on a signal line for carrying said up command among said command output, and a frequency upper limit detector connected to said switch and adapted to produce a cut-off command to said switch when the system frequency has exceeded the preset upper limit.

5. An automatic control system according to claim 3, wherein said frequency lower limit setting means comprises a switch provided on a signal line for carrying said down command among said command output, and a frequency lower limit detector connected to said switch and adapted to produce a cut-off signal to said switch when the system frequency has fallen below the preset lower limit.

* * * * *